W. S. WAGNER.
FLY TRAP.
APPLICATION FILED MAY 16, 1908.
909,041.  Patented Jan. 5, 1909.
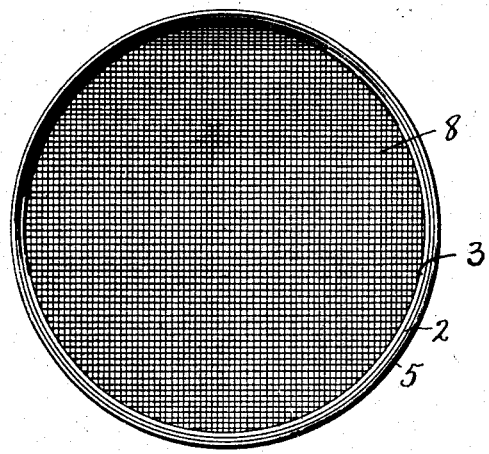
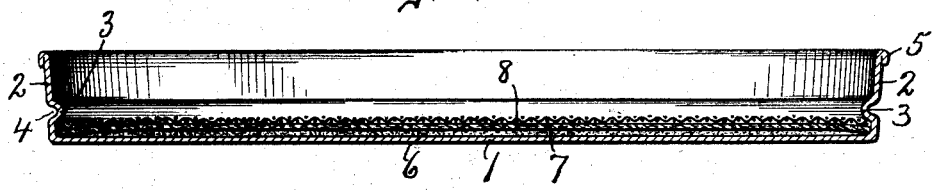
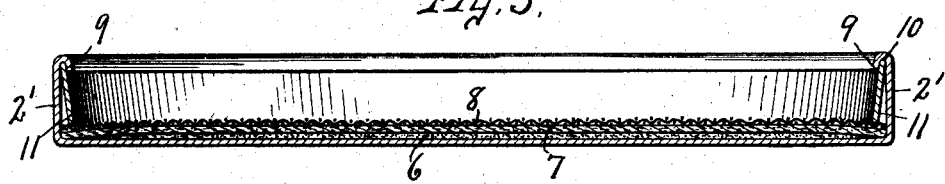
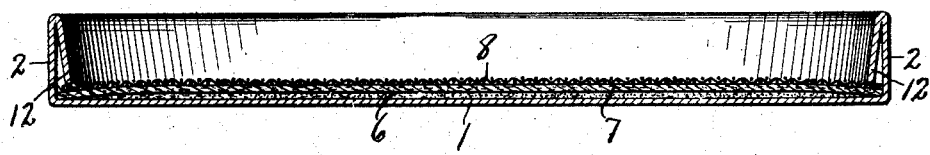
Witnesses.
T. C. Thomas
H. E. Chase
Inventor.
W. S. Wagner
By. Howard P. Denison
Attorney.

UNITED STATES PATENT OFFICE.

WILLIAM S. WAGNER, OF SYRACUSE, NEW YORK, ASSIGNOR TO LEWIS P. SMITH, OF SYRACUSE, NEW YORK.

FLY-TRAP.

No. 909,041.      Specification of Letters Patent.      Patented Jan. 5, 1909.

Application filed May 16, 1908. Serial No. 433,318.

*To all whom it may concern:*

Be it known that I, WILLIAM S. WAGNER, of Syracuse, in the county of Onondaga, in the State of New York, have invented new and useful Improvements in Fly-Traps, of which the following, taken in connection with the accompanying drawings, is a full, clear, and exact description.

This invention relates to certain improvements in fly traps comprising essentially a circular receptacle containing in its bottom a circular disk of liquid absorbent, a powder poison concealed by the disk and a wire screen protector, covering and protecting the top of the disk and held in place by suitable detents within the receptacle and engaging the marginal edges of the wire screen.

My object is to provide a simple, comparatively small and easily portable fly trap of the character described which may be manufactured at a minimum cost, is neat in appearance and obviates any liability of overflowing, of the liquid, which is used to saturate the absorbent disk and thereby moisten the powder poison and cause the latter to saturate the absorbent disk so that flies lighting upon the screen and absorbing the poison of the disk will be instantly destroyed.

Another object is to provide a simple means for retaining the screen protector together with the underlying paper disk and powder poison in place so that the entire device may be handled carelessly without liability of displacing any of the inclosed parts.

A further object is to provide the sides of the receptacle with substantially vertical walls extending some distance above the screen and underlying parts to prevent overflow of the liquid which may be used to saturate the disk and dissolve the powder poison.

Other more specific objects and uses will be brought out in the following description.

In the drawings—Figure 1 is a top plan of a fly trap embodying the various features of my invention. Fig. 2 is an enlarged transverse sectional view through the trap shown in Fig. 1. Figs. 3 and 4 are sectional views similar to Fig. 2 showing modified forms of retainers for the screen and underlying disk together with a powder poison which is interposed between the disk and bottom of the receptacle.

The trap shown in Figs. 1 and 2 consists essentially of a one piece sheet metal shell or receptacle circular in form and consisting of a substantially flat bottom —1— and upright sides —2— forming an upright annular flange projecting some distance beyond the bottom —1—, the lower portions of the sides just above the bottom being indented or pressed inwardly forming an inwardly projecting rib —3— and corresponding annular groove —4—, the upper edge of the sides —2— is preferably overturned outwardly forming a suitable finishing bead —5— to obviate the exposure of a sharp edge which might cut the fingers in handling the device, the portion of the sides —2— above the rib —3— flaring outwardly slightly to permit the traps to be nested one into another for shipment or storage. The rib —3— is located nearer the bottom than the top or in other words the distance between the bottom —1— and rib —3— is less than the distance between the rib —3— and upper sides —2— so as to allow ample space above the rib for the reception of liquid which is poured into the receptacle for the purpose of saturating an absorbent disk presently described.

Upon the bottom —1— and within the receptacle is placed a thin layer —6— of powder poison which is covered by a circular disk —7— of moisture absorbent such as paper having its marginal edges fitting snugly against the faces of the sides —2— and close to the bottom —1—, the purpose of this disk being to retain the powder poison in place and at the same time to retain a quantity of moisture which dissolves the powder and causes the latter to become saturated or permeated through the paper disk. This disk is in turn held in place and protected against mutilation by a circular screen —8— of wire fabric of substantially the same area as the bottom —1— of the receptacle and completely covering the disk —7—.

The rib —3— is impressed inwardly in the sides of the receptacle directly from the marginal edges of the wire screen —8— so as to press said marginal edges of the screen and underlying edges of the disk —7— downwardly close to the bottom —1— of the receptacle thereby firmly and permanently holding the screen and disk in place and bringing the marginal edges of the disk against the bottom —1— of the receptacle to retain the poison powder layer —6— in place against any liability of its sifting out at the edges of the disk and screen when the receptacle is handled.

The device shown in Fig. 3 is very similar to that shown in Figs. 1 and 2 except that the receptacle —1— is provided with vertical sides —2'— extending some distance above the bottom —1— and having the upper edges of the sides overturned inwardly and spaced apart from the sides a slight distance forming an annular flange —9— and an annular groove —10— in which is fitted the upper edge of a metal retaining ring —11— having its lower edge pressing against the upper face of the marginal edges of the screen —8—. In this instance, the retaining means for the screen and underlying disk —7— is separate from the receptacle and is held in place by the annular flange —9—.

In Fig. 4 I have shown a receptacle comprising a bottom —1— and vertical sides —2— extending some distance above the bottom and having their upper edge overturned inwardly and downwardly against the upper face of the marginal edge of the screen —8— to hold the latter and underlying disk —7— in place.

In all these modifications, however, the retaining means for the screen and underlying disk is pressed against the upper face of the marginal edges of the screen to force the disk downwardly against the bottom to hold the powder poison from sifting out around the edges of the disk.

What I claim is:

1. A fly trap comprising a circular receptacle having a bottom and upright sides extending some distance above the bottom, a poison absorbent disk having its marginal edges resting upon the bottom, portions of the sides of the receptacle being impressed inwardly just above the marginal edges of the disk to retain the latter in place.

2. A fly trap comprising a receptacle having a bottom and upright sides extending some distance above the bottom, a layer of poison powder upon the bottom and within the receptacle, an absorbent disk covering the layer of powder poison, a screen protector covering the upper face of the disk and resting against the same, and means within the receptacle engaging the marginal edges of the screen for holding said screen and also the disk and layer of powder in place.

3. A fly trap comprising a circular receptacle having a bottom and upright sides extending some distance above the bottom, a layer of poison powder upon the bottom and within the receptacle, a circular disk of absorbent material covering the layer of poison powder and lying close to the bottom of the receptacle, a screen protector covering the top face of the disk and having its marginal edges close to the sides of the receptacle, and means for pressing the marginal edges of the screen and disk downwardly toward the bottom and holding such parts in place.

In witness whereof I have hereunto set my hand this 2nd day of May 1908.

WILLIAM S. WAGNER.

Witnesses:
H. E. Chase,
Caroline McCormack.